(12) United States Patent
Wu et al.

(10) Patent No.: US 12,438,998 B2
(45) Date of Patent: Oct. 7, 2025

(54) DISPLAY CONTROL METHOD, DISPLAY CONTROL DEVICE, DISPLAY APPARATUS AND COMPUTER READABLE MEDIUM

(71) Applicant: BOE Technology Group Co., Ltd., Beijing (CN)

(72) Inventors: Congrui Wu, Beijing (CN); Lihua Geng, Beijing (CN); Xitong Ma, Beijing (CN); Ran Duan, Beijing (CN); Xian Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/273,330

(22) PCT Filed: Oct. 27, 2021

(86) PCT No.: PCT/CN2021/126665
§ 371 (c)(1),
(2) Date: Jul. 20, 2023

(87) PCT Pub. No.: WO2023/070362
PCT Pub. Date: May 4, 2023

(65) Prior Publication Data
US 2024/0244156 A1    Jul. 18, 2024

(51) Int. Cl.
*H04N 5/265* (2006.01)
*G06F 3/147* (2006.01)
(Continued)

(52) U.S. Cl.
CPC ............ *H04N 5/265* (2013.01); *G06F 3/147* (2013.01); *G06T 7/0002* (2013.01); *H04N 7/01* (2013.01);
(Continued)

(58) Field of Classification Search
CPC .. H04N 21/40; H04N 21/43; H04N 21/43072; H04N 21/43074;
(Continued)

(56) References Cited

U.S. PATENT DOCUMENTS 5,446,496 A * 8/1995 Foster .................... G09G 5/005
348/E7.003
2006/0244864 A1* 11/2006 Hayashi .................. H04N 5/45
348/E5.103
(Continued)

FOREIGN PATENT DOCUMENTS

CN          102421008 A     4/2012
CN          104333721 A     2/2015
(Continued)

*Primary Examiner* — John W Miller
*Assistant Examiner* — Humam M Satti
(74) *Attorney, Agent, or Firm* — HOUTTEMAN LAW LLC

(57) ABSTRACT

The present disclosure provides a display control method, including: performing a splitting processing on a source video stream of a display panel in response to a multi-path display control instruction, to obtain a plurality of same video sub-streams; acquiring a processing parameter corresponding to each video sub-stream, and processing the video sub-stream according to the processing parameter; and performing a tiling and merging operation on the processed video sub-streams to obtain an output video stream, and outputting the output video stream to the display panel for displaying. The present disclosure further provides a display control device, a display apparatus, and a computer readable medium.

17 Claims, 5 Drawing Sheets

Generate a timing control signal according to the timing parameter corresponding to the display panel, perform a timing adjustment on the processed video sub-streams according to the timing control signal, and perform the tiling and merging operation on the video sub-streams subjected to the timing adjustment — S3 / S301

(51) Int. Cl.
*G06T 7/00* (2017.01)
*H04N 7/01* (2006.01)

(52) U.S. Cl.
CPC ............... *G06T 2207/10016* (2013.01); *G06T 2207/10024* (2013.01); *G06T 2207/20221* (2013.01); *G06T 2207/30204* (2013.01)

(58) Field of Classification Search
CPC ..... H04N 21/431–4316; H04N 9/3191; H04N 17/00; H04N 17/004; H04N 17/02; H04N 17/04; H04N 17/045; H04N 5/2628; H04N 5/265; H04N 7/01; H04N 21/234; H04N 21/4312; H04N 21/4314; G06F 3/14; G06F 3/1446; G06F 3/147; G09G 2300/026; G09G 2360/122; G09G 3/006; G09G 2320/0686; G09G 2320/0613; G09G 2320/0666; G09G 2320/08; G09G 2340/06; G09G 2354/00; G09G 5/14; G09G 2370/20; G09G 2340/04; G09G 2340/0464; G09G 2340/0471; G09G 2340/0478; G09G 2340/0485; G06T 2207/20021; G06T 7/0002; G06T 2207/10016; G06T 2207/10024; G06T 2207/20221; G06T 2207/30204; G06T 3/40

See application file for complete search history.

(56) References Cited

U.S. PATENT DOCUMENTS

| | | | |
|---|---|---|---|
| 2013/0050274 A1* | 2/2013 | Yamada | H04N 21/4751 345/671 |
| 2014/0267908 A1* | 9/2014 | Hagenbuch | G09G 5/14 348/584 |
| 2016/0291917 A1* | 10/2016 | Hu | G06F 3/1446 |
| 2019/0076737 A1* | 3/2019 | Wittke | A63F 13/65 |
| 2020/0241828 A1* | 7/2020 | Noyelle | G09G 3/3208 |
| 2024/0040077 A1* | 2/2024 | Park | G06T 5/92 |

FOREIGN PATENT DOCUMENTS

| | | |
|---|---|---|
| CN | 104735297 A | 6/2015 |
| CN | 107295360 A | 10/2017 |
| CN | 109040614 A | 12/2018 |
| CN | 110109634 A | 8/2019 |
| CN | 212785629 U | 3/2021 |
| CN | 113163214 A | 7/2021 |

\* cited by examiner

Perform the splitting processing on the source video stream according to the number of the video sub-streams and the resolution of the display panel — S101

Generate a timing control signal according to the timing parameter corresponding to the display panel, perform a timing adjustment on the processed video sub-streams according to the timing control signal, and perform the tiling and merging operation on the video sub-streams subjected to the timing adjustment — S301

Determine an arrangement according to the number of the video sub-streams and the resolution of the display panel, and determine a first display area corresponding to each video sub-stream — S31

S3

Perform the tiling and merging operation on the processed video sub-streams according to the arrangement and the first display area corresponding to each video sub-stream — S32

FIG. 5

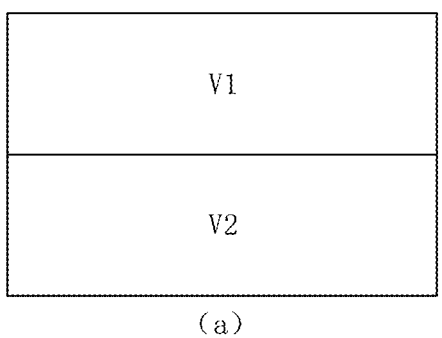
(a)

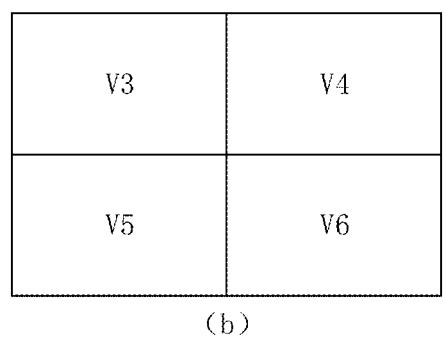
(b)

FIG. 6

DISPLAY CONTROL METHOD, DISPLAY CONTROL DEVICE, DISPLAY APPARATUS AND COMPUTER READABLE MEDIUM

TECHNICAL FIELD

The present disclosure relates to the field of display technology, in particular to a display control method, a display control device, a display apparatus, and a computer readable medium.

BACKGROUND

In some usage scenes of a display apparatus (e.g. a monitor), generally, there are high requirements on the display quality of the display apparatus and the color rendition of the image. A user necessarily changes parameters for a video image frequently, correspondingly processes the video image, and monitors the processing result for the video image. At present, the processing for the video image has a low flexibility in the operation, so that it is difficult for the user to simultaneously monitor multiple processing results of video images.

SUMMARY

The present disclosure is directed to at least one of the technical problems in the prior art, and provides a display control method, a display control device, a display apparatus, and a computer readable medium.

To achieve the above object, in a first aspect, an embodiment of the present disclosure provides a display control method, including: performing a splitting processing on a source video stream of a display panel in response to a multi-path display control instruction, to obtain a plurality of video sub-streams the same as each other: acquiring a processing parameter corresponding to each video sub-stream, and processing the video sub-stream according to the processing parameter; and performing a tiling and merging operation on the processed video sub-streams to obtain an output video stream, and outputting the output video stream to the display panel for displaying.

In some implementations, before performing the splitting processing on the source video stream of the display panel in response to the multi-path display control instruction, to obtain the video sub-streams the same as each other, the display control method further includes: performing a conversion process on the source video stream according to a display parameter of the display panel, the display parameter including at least one of a timing parameter, a color parameter, a resolution parameter, or a frame rate parameter.

In some implementations, before acquiring the processing parameter corresponding to each video sub-stream, and processing the video sub-stream according to the processing parameter, the display control method further includes: performing a video analysis on each video sub-stream according to a preset first analysis item, the first analysis item including at least one of a color waveform analysis, a video luminance waveform analysis, a video color histogram analysis, a video luminance histogram analysis, a video color vector analysis, a video luminance pseudo-color marking, a video focus quality analysis, a video luminance area marking, or a video pixel visualization marking.

In some implementations, the processing parameter includes: at least one of a color gamut parameter, a brightness parameter, a color temperature parameter, or a sharpness parameter.

In some implementations, before performing the tiling and merging operation on the processed video sub-streams to obtain the output video stream, the display control method further includes: performing a difference analysis on at least two of the processed video sub-streams in pairs according to a preset second analysis item, the second analysis item including at least one of a pixel value difference analysis, a pixel gray value difference analysis, or a pixel gradient characteristic value difference analysis.

In some implementations, after performing the difference analysis on at least two of the processed video sub-streams in pairs according to the preset second analysis item, the display control method includes: marking pixels satisfying a preset marking condition in an On Screen Display (OSD) manner according to the difference analysis result, the marking condition being that a difference value between any two pixels subjected to the difference analysis is greater than a preset difference threshold.

In some implementations, the multi-path display control instruction includes the number of the video sub-streams; and the performing the splitting processing on the source video stream of the display panel in response to the multi-path display control instruction, to obtain the plurality of video sub-streams the same as each other, includes: performing the splitting processing on the source video stream according to the number of the video sub-streams and a resolution of the display panel.

In some implementations, the performing the tiling and merging operation on the processed video sub-streams to obtain the output video stream, includes: generating a timing control signal according to the timing parameter corresponding to the display panel, performing a timing adjustment on the processed video sub-streams according to the timing control signal, and performing the tiling and merging operation on the video sub-streams subjected to the timing adjustment.

In some implementations, the performing the tiling and merging operation on the processed video sub-streams to obtain the output video stream, includes: determining an arrangement according to the number of the video sub-streams and the resolution of the display panel, and determining a first display area corresponding to each video sub-stream; and performing the tiling and merging operation on the processed video sub-streams according to the arrangement and the first display area corresponding to each video sub-stream.

In some implementations, for each video sub-stream, the display control method further includes: performing a video analysis on the video sub-stream according to a preset first analysis item: the determining an arrangement according to the number of the video sub-streams and the resolution of the display panel, and determining a first display area corresponding to each video sub-stream, includes: determining the arrangement according to the number of the video sub-streams and the resolution of the display panel, determining the first display area corresponding to each video sub-stream, and determining a second display area corresponding to a video analysis result image; and the performing the tiling and merging operation on the processed video sub-streams according to the arrangement and the first display area corresponding to each video sub-stream, includes: performing the tiling and merging operation on the processed video sub-streams and the video analysis result image according to the arrangement, the first display area corresponding to each video sub-stream and the second display area corresponding to the video analysis result image.

In a second aspect, an embodiment of the present disclosure further provides a display control device, including: a splitting processing module including a plurality of split output terminals, the splitting processing module being configured to perform a splitting processing on a source video stream of a display panel in response to a multi-path display control instruction, to obtain a plurality of video sub-streams the same as each other, and output each video sub-stream through a corresponding one of the split output terminals: a video sub-stream processing module including a plurality of processing units, each processing unit corresponding to one split output terminal, and being configured to acquire a processing parameter corresponding to each video sub-stream, process the video sub-stream according to the processing parameter, and output the processed video sub-stream; and a tiling and merging module configured to perform a tiling and merging operation on the processed video sub-streams to obtain an output video stream, and output the output video stream to the display panel for displaying.

In some implementations, the display control device further includes: a conversion processing module configured to perform a conversion process on the source video stream according to a display parameter of the display panel, the display parameter including at least one of a timing parameter, a color parameter, a resolution parameter, or a frame rate parameter.

In some implementations, the video sub-stream processing module further includes: a plurality of analysis units in one-to-one correspondence with the plurality of processing units, each analysis unit being configured to perform a video analysis on each video sub-stream according to a preset first analysis item, the first analysis item including at least one of a color waveform analysis, a video luminance waveform analysis, a video color histogram analysis, a video luminance histogram analysis, a video color vector analysis, a video luminance pseudo-color marking, a video focus quality analysis, a video luminance area marking, or a video pixel visualization marking.

In some implementations, the display control device further includes: a difference analysis module configured to perform a difference analysis on at least two of the processed video sub-streams in pairs according to a preset second analysis item, the second analysis item including at least one of a pixel value difference analysis, a pixel gray value difference analysis, or a pixel gradient characteristic value difference analysis.

In some implementations, the tiling and merge module further includes: a timing control unit configured to generate a timing control signal according to the timing parameter corresponding to the display panel; and the tiling and merging module is configured to perform a timing adjustment on the processed video sub-streams according to the timing control signal, and perform the tiling and merging operation on the video sub-streams subjected to the timing adjustment.

In some implementations, the tiling and merging module is configured to determine an arrangement according to the number of the video sub-streams and the resolution of the display panel, and determine a first display area corresponding to each video sub-stream; and perform the tiling and merging operation on the processed video sub-streams according to the arrangement and the first display area corresponding to each video sub-stream.

In some implementations, the video sub-stream processing module includes a plurality of analysis units, where the tiling and merging module is configured to determine the arrangement according to the number of the video sub-streams and the resolution of the display panel, determine the first display area corresponding to each video sub-stream, and determine a second display area corresponding to a video analysis result image of each analysis unit, the first display area and the second display area being not overlapped with each other, and perform the tiling and merging operation on the processed video sub-streams and the video analysis result image according to the arrangement, the first display area corresponding to each video sub-stream and the second display area corresponding to the video analysis result image.

In a third aspect, an embodiment of the present disclosure further provides a display apparatus, including: a display panel and the display control device described in above embodiment.

In a fourth aspect, an embodiment of the present disclosure further provides a computer readable medium storing a computer program thereon, the computer program, executed by a processor, causes the processor to implement the display control method described in above embodiment.

BRIEF DESCRIPTION OF DRAWINGS

The accompanying drawings, which are provided for further understanding of the present disclosure and constitute a part of this specification, are for explaining the present disclosure together with the embodiments of the present disclosure, but are not intended to limit the present disclosure. The above and other features and advantages will become more apparent to ordinary skill in the art by describing in detail exemplary embodiments with reference to the drawings. In the drawings:

FIG. 3 is a flowchart of a specific implementation of step S1 according to an embodiment of the present disclosure;

FIG. 4 is a flowchart of a specific implementation of step S3 according to an embodiment of the present disclosure;

FIG. 5 is a flowchart of a specific implementation of step S3 according to an embodiment of the present disclosure:

FIG. 6 is a schematic diagram of an arrangement of step S3 according to an embodiment of the present disclosure;

DETAIL DESCRIPTION OF EMBODIMENTS

In order to enable ordinary skills in the art to better understand the technical solutions of the present disclosure, a display control method, a display control device, a display apparatus, and a computer readable medium will be described in detail with reference to the accompanying drawings.

Example embodiments will be described more fully hereinafter with reference to the accompanying drawings, but may be embodied in different forms and should not be construed as limited to the forms set forth herein. Rather, these embodiments are provided so that the present disclosure will be thorough and complete, and will fully convey the scope of the present disclosure to ordinary skills in the art.

The terms used herein are for the purpose of describing particular embodiments only and are not intended to limit the present disclosure. As used herein, the singular forms "a", "an" and "the" are intended to include a plural form as well, unless the context clearly indicates otherwise. It should be further understood that, the terms of "including" and/or "comprising", when used in this specification, specify the presence of stated features, integers, steps, operations, elements, and/or components, but do not preclude the presence or addition of one or more other features, integers, steps, operations, elements, components, and/or groups thereof.

It will be understood that the terms "first", "second", etc. may be used herein to describe various elements, but these elements should not be limited by these terms. These terms are only used to distinguish one element from another. Thus, a first element, a first component, or a first module discussed below could be termed a second element, a second component, or a second module, without departing from the teachings of the present disclosure.

Unless otherwise defined, all terms (including technical and scientific terms) used herein have the same meaning as commonly understood by one of ordinary skill in the art. It should be further understood that terms, such as those defined in commonly used dictionaries, should be interpreted as having a meaning that is consistent with their meaning in the context of the relevant art and the present disclosure, and should not be interpreted in an idealized or overly formal sense unless expressly so defined herein.

Figure 1:
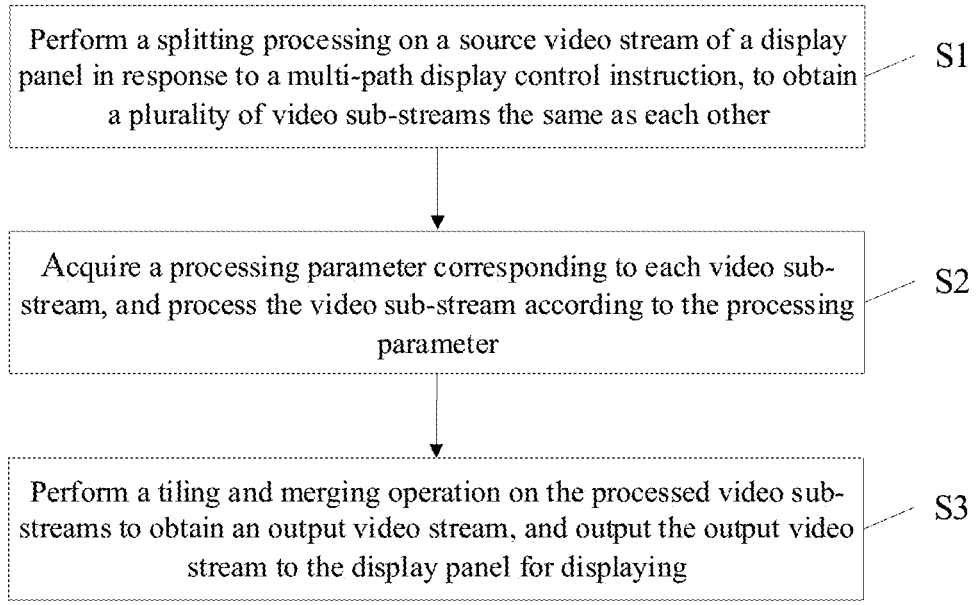
FIG. 1 is a flowchart of a display control method according to an embodiment of the present disclosure.

FIG. 1 is a flowchart of a display control method according to an embodiment of the present disclosure. As shown in FIG. 1, the method includes following steps S1 to S3.

Step S1, performing a splitting processing on a source video stream of a display panel in response to a multi-path display control instruction, to obtain a plurality of video sub-streams the same as each other.

The video sub-streams the same as each other have a same data content, and timings synchronized with each other. In some implementations, the video sub-streams have the same perceivable video content as the source video stream, but have a different data format and/or resolution from the source video stream. In some implementations, the source video stream is input into a plurality of parallel video interfaces to be split into the video sub-streams. In some implementations, in order to cooperate the splitting processing, a storage control logic for the video sub-streams is further provided, and a buffer is provided.

Step S2, acquiring a processing parameter corresponding to each video sub-stream, and processing the video sub-stream according to the processing parameter.

A video image processing is performed on each video sub-stream according to the processing parameter, which corresponds to a processing process which can be perceived by human eyes. For example, the video sub-streams are changed in terms of chrominance and brightness and the like.

In some implementations, a pre-stored and pre-set processing parameter is acquired. Alternatively, in some implementations, the processing parameter input into a system in real-time is acquired.

In some implementations, the processing parameter includes: at least one of a color gamut parameter, a brightness parameter, a color temperature parameter, or a sharpness parameter.

In some implementations, the video sub-streams have different processing parameters. For example, a color gamut parameter of one video sub-stream is adjusted, and a brightness parameter of another video sub-stream is adjusted, so that different video image processing operations may be performed on the video sub-streams with the same content, or the same video image processing operation may be performed on the video sub-streams based on different parameter configurations.

Step S3, performing a tiling and merging (combining) operation on the processed video sub-streams to obtain an output video stream, and outputting the output video stream to the display panel for displaying.

The tiling and merging operation being performed on the processed video sub-streams corresponds to splicing the processed video sub-streams to obtain the output video stream which is adapted to the display panel. In this process, the video content of the video sub-streams is not changed, and the processed video sub-streams are only spliced into the complete output video stream, so that the processed video sub-streams can be displayed on the same display apparatus.

The embodiment of the present disclosure provides the display control method, which can perform the splitting processing on the source video stream, to obtain the plurality of video sub-streams the same as each other: process the video sub-streams based on different processing parameters; and perform the tiling and merging operation on the processed video sub-streams, so that a plurality of video processing operations can be simultaneously performed on the same source video stream, and results of the video processing operations can be displayed in the same picture, and thus, the flexibility of the video image processing can be improved, and the results of the video processing operations can be simultaneously monitored by using a single display apparatus.

Figure 2:
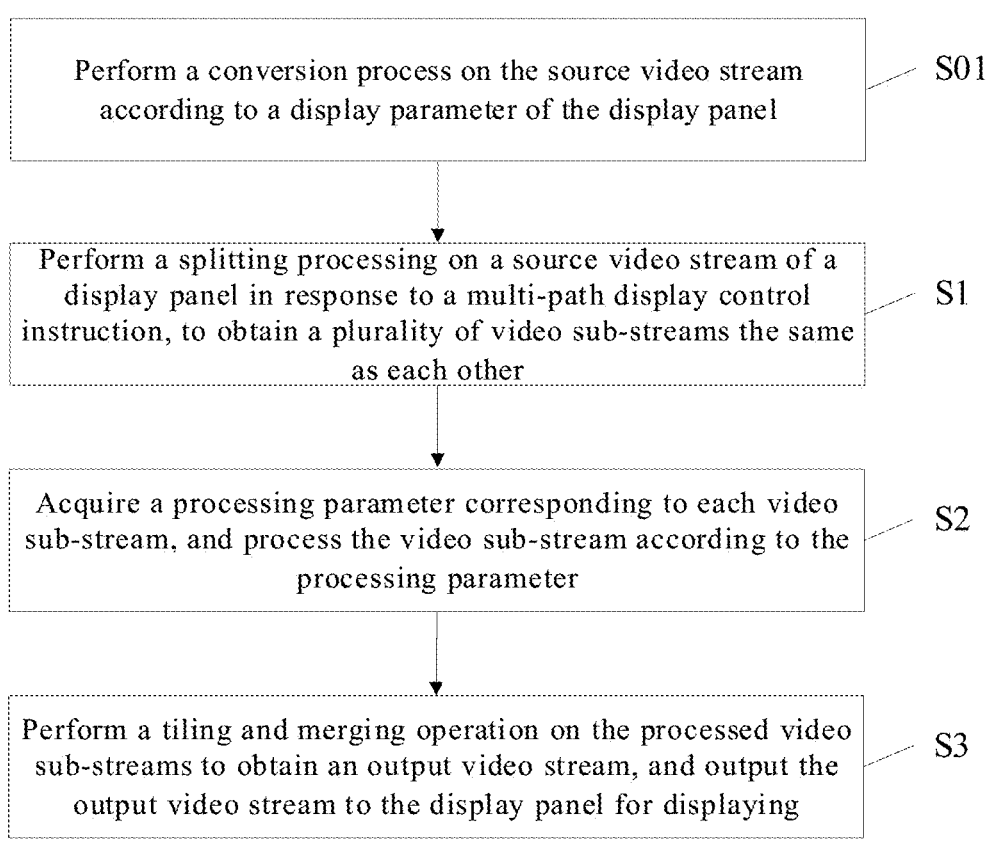
FIG. 2 is a flowchart of a display control method according to an embodiment of the present disclosure.

FIG. 2 is a flowchart of a display control method according to an embodiment of the present disclosure. As shown in FIG. 2, the method is a specific alternative embodiment based on the method shown in FIG. 1. Specifically, the method includes not only the steps S1 to S3 but also step S01 before step S1. Only step S01 will be described in detail below.

In the step S01, a conversion process is performed on the source video stream according to a display parameter of the display panel.

The step S1 of performing the splitting processing on the source video stream of the display panel is performed after the step S01 of performing the conversion process on the source video stream. The conversion process corresponds to pre-processing the source video stream, so that the pre-processed source video stream conforms to the display expectations of the display panel. Specifically, the conversion process may include a format conversion and a resolution conversion.

The display parameter includes: at least one of a timing parameter, a color parameter, a resolution parameter, or a frame rate parameter: the color parameter corresponds to the adapted color space, such as a red, green and blue (RGB)

color space, a luminance and chrominance (YUV) color space, or the like: the resolution parameter corresponds to a full high definition (FHD), 4K, 8K, or the like: the frame rate parameter may be 50 hz, 60 hz, 120 hz, or the like. The conversion process performed on the source video stream according to the display parameter of the above type includes: a timing synchronization process, a color space conversion process, an up-sampling or down-sampling process, and a frame rate conversion process.

In some implementations, the display parameter further includes a splicing parameter, which is also called an arrangement parameter, such as a two sample interleave (2SI) and a square division (SQD) for a 4K image video stream. The conversion process performed on the source video stream according to the display parameter of the above type includes: a splicing conversion process.

In some implementations, module devices at subsequent stages corresponding to subsequent steps include a fixed algorithm module, which has strict expectations on a timing and a data format and the like of an input signal. For example, each processing channel of the module at the subsequent stage for performing parallel processing on the plurality of video sub-streams is adapted to process videos in RGB444/FHD/60 hz/SQD format, and in such case, the step SOI is to be performed to perform the conversion process, so as to ensure that the video format and the timing conform to the input expectations of the subsequent module device.

FIG. 3 is a flowchart of a specific implementation of step S1 according to an embodiment of the present disclosure. Specifically, the multi-path display control instruction may be input by a user, and may include the number of the video sub-streams; as shown in FIG. 3, the step S1 of performing the splitting processing on the source video stream of the display panel in response to the multi-path display control instruction, to obtain the plurality of video sub-streams the same as each other, includes: a step S101.

In the step S101, the splitting processing is performed on the source video stream according to the number of the video sub-streams and the resolution of the display panel.

In some implementations, a resolution of each sub-data stream is determined according to the number of the video sub-streams and the resolution of the display panel. For example, the resolution of each sub-data stream is determined according to a ratio of the resolution of the display panel to the number of the video sub-streams, and the source video stream is processed to obtain a plurality of data sub-streams, the number of the data sub-streams being equal to the number of the video sub-streams, and the resolution is the resolution previously determined. Alternatively, in some implementations, a minimum resolution of the data sub-streams or a maximum number of the data sub-streams is provided in advance, and the resolution of each data sub-stream and the actual number of the video sub-streams are determined according to the number of the video sub-streams and the resolution of the display panel, so that the source video stream is processed to obtain the plurality of data sub-streams.

FIG. 4 is a flowchart of a specific implementation of step S3 according to an embodiment of the present disclosure. As shown in FIG. 4, the step S3 of performing the tiling and merging operation on the processed video sub-streams to obtain the output video stream, includes: step S301.

In the step S301, a timing control signal is generated according to the timing parameter corresponding to the display panel, a timing adjustment is performed on the processed video sub-streams according to the timing control signal, and the tiling and merging operation is performed on the video sub-streams subjected to the timing adjustment.

The resolution of the video sub-streams may not correspond to the display parameter of the display panel, and the timing of the video sub-streams may not correspond to the timing parameter of the display panel, and thus the timing adjustment is performed on the video sub-streams. In this way, the video sub-streams subjected to the tiling and merging operation can be normally displayed.

FIG. 5 is a flowchart of a specific implementation of step S3 according to an embodiment of the present disclosure. As shown in FIG. 5, the step S3 of performing the tiling and merging operation on the processed video sub-streams to obtain the output video stream, includes: step S31 and step S32.

In the step S31, an arrangement is determined according to the number of the video sub-streams and the resolution of the display panel, and a first display area corresponding to each video sub-stream is determined.

The arrangement corresponding to the tiling and merging operation is determined, and a pixel display position (namely, the first display area) corresponding to each video sub-stream is determined.

In the step S32, the tiling and merging operation is performed on the processed video sub-streams according to the arrangement and the first display area corresponding to each video sub-stream.

FIG. 6 is a schematic diagram of an arrangement of step S3 according to an embodiment of the present disclosure. Arrangements respectively corresponding to two video sub-streams and four video sub-streams are exemplarily shown in FIG. 6. A part (a) of FIG. 6 exemplarily shows an arrangement corresponding to the two video sub-streams, in which the two video sub-streams are arranged and tiled in a column direction: V1, V2 respectively represent first display areas corresponding to the two video sub-streams. A part (b) of FIG. 6 exemplarily shows an arrangement corresponding to the four video sub-streams, in which the four video sub-streams are arranged and tiled in a row direction and in the column direction: V3, V4, V5, and V6 respectively represent first display areas corresponding to the four video sub-streams. It should be noted that, in some implementations, a shape of each first display area may be a regular pattern, such as a rectangle, a triangle, a circle, or the like, and the first display areas may be arranged and tiled in the column direction, the row direction, a diagonal direction, or the like. Alternatively, in some implementations, the shape of each first display area may also be an irregular pattern as desired. In some implementations, sizes of the first display areas corresponding to the video sub-streams are the same. Alternatively, in some implementations, the sizes of the first display areas corresponding to the video sub-streams may be different. A main video sub-stream concerned may be selected so that the first display area corresponding thereto occupies a larger area (have a greater size).

Figure 7:
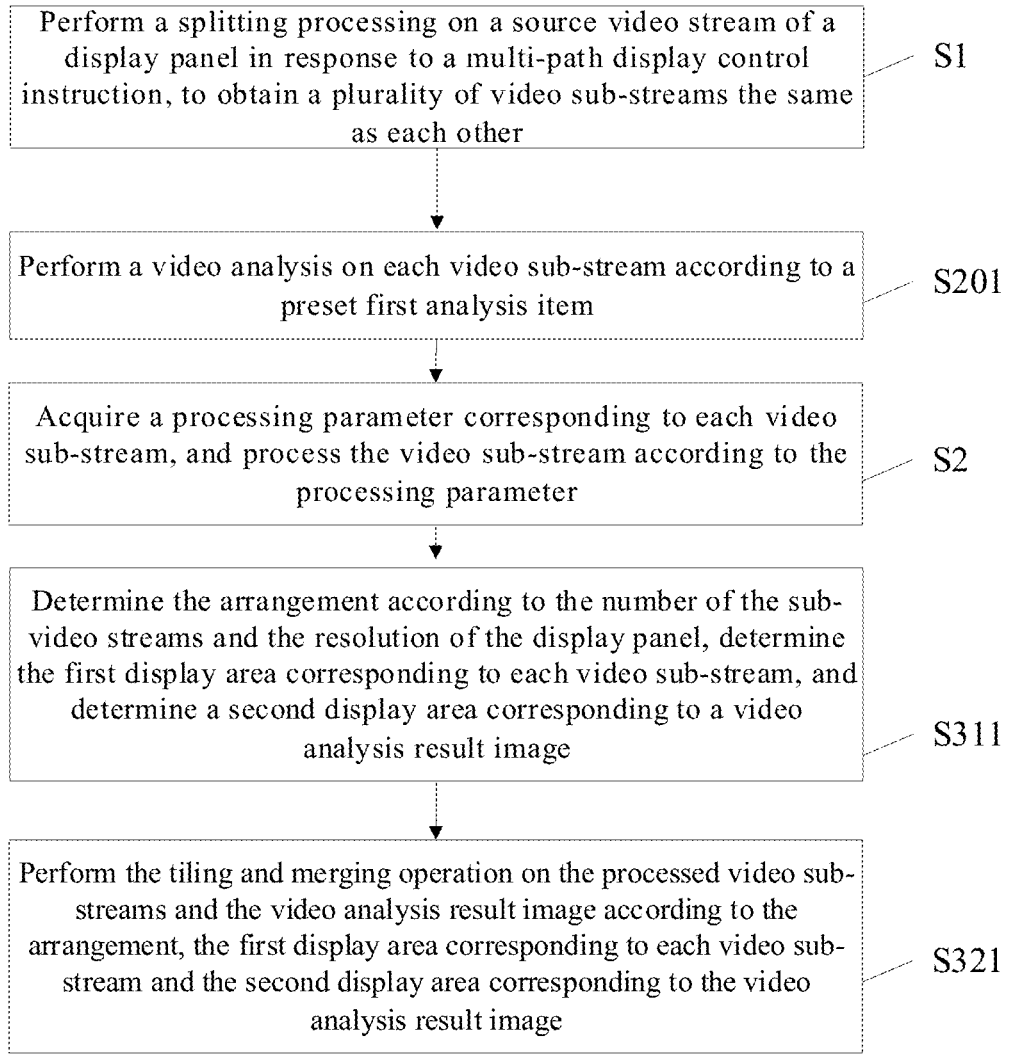
FIG. 7 is a flowchart of a display control method according to an embodiment of the present disclosure.

FIG. 7 is a flowchart of a display control method according to an embodiment of the present disclosure. In particular, the method is a specific alternative embodiment based on the method shown in FIGS. 1 and 5. As shown in FIG. 6, the method not only includes steps S1 to S32, but also includes step S201 before step S2. In some implementations, for step S3, step S31 includes step S311, and step S32 includes step S321. Only step S201, step S311, and step S321 will be described in detail below.

Before the step S2 of acquiring a processing parameter corresponding to each video sub-stream, and processing the video sub-stream according to the processing parameter, the method further includes: step S201.

In the step S201, a video analysis is performed on each video sub-stream according to a preset first analysis item.

Before the video image processing is performed on each video sub-stream, the video sub-stream may be analyzed firstly to determine video image parameters of the video sub-stream for subsequently accurately processing. The first analysis item includes: at least one of a color waveform analysis, a video luminance waveform analysis, a video color histogram analysis, a video luminance histogram analysis, a video color vector analysis, a video luminance pseudo-color marking, a video focus quality analysis, a video luminance area marking, or a video pixel visualization marking.

In some implementations, as shown in FIG. 7, on the basis of the step S201 of performing the video analysis on each video sub-stream according to the preset first analysis item, and the step S31 of determining the arrangement according to the number of the video sub-streams and the resolution of the display panel, and determining the first display area corresponding to each video sub-stream, includes: step S311: the step S32 of performing the tiling and merging operation on the processed video sub-streams according to the arrangement and the first display area corresponding to each video sub-stream, includes: step S321.

In the step S311, the arrangement is determined according to the number of the video sub-streams and the resolution of the display panel, the first display area corresponding to each video sub-stream is determined, and a second display area corresponding to a video analysis result image is determined.

The first display area is configured to display the video sub-stream: the second display area, also called a reserved area, is configured to display the video analysis result image corresponding to each video sub-stream, where the video analysis result image is generated according to the video analysis result and can represent video image parameters of the video sub-stream. By providing the second display area, the perceptibility of the video image processing operation can be improved, so that a user can intuitively determine the video image processing effect and the degree of change. By providing the second display area, the excessive conversion of the resolution of the video sub-stream can be avoided, thereby preventing the display picture from being compressed or stretched.

In the step S321, the tiling and merging operation is performed on the processed video sub-streams and the video analysis result image according to the arrangement, the first display area corresponding to each video sub-stream and the second display area corresponding to the video analysis result image.

Figure 8:
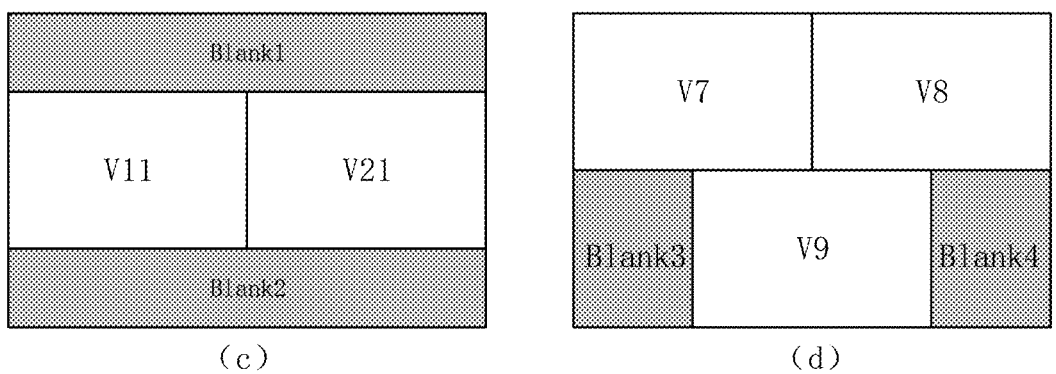
FIG. 8 is a schematic diagram illustrating an arrangement of step S3 according to an embodiment of the present disclosure.

FIG. 8 is a schematic diagram illustrating an arrangement of step S3 according to an embodiment of the present disclosure. Arrangements respectively corresponding to two video sub-streams and three video sub-streams are exemplarily shown in FIG. 8. A part (c) of FIG. 8 exemplarily shows an arrangement corresponding to the two video sub-streams, in which the two video sub-streams are arranged and tiled in the row direction: V11, V12 respectively represent first display areas corresponding to the two video sub-streams: Blank1, Blank2 respectively represent two second display areas each configured to display the video analysis result image corresponding to at least one of the two video sub-streams. A part (d) of FIG. 8 exemplarily shows an arrangement corresponding to the three video sub-streams: V7, V8, and V9 respectively represent first display areas corresponding to the three video sub-streams: Blank3, Blank4 respectively represent two second display areas each configured to display the video analysis result image corresponding to at least one of the three video sub-streams.

Figure 9:
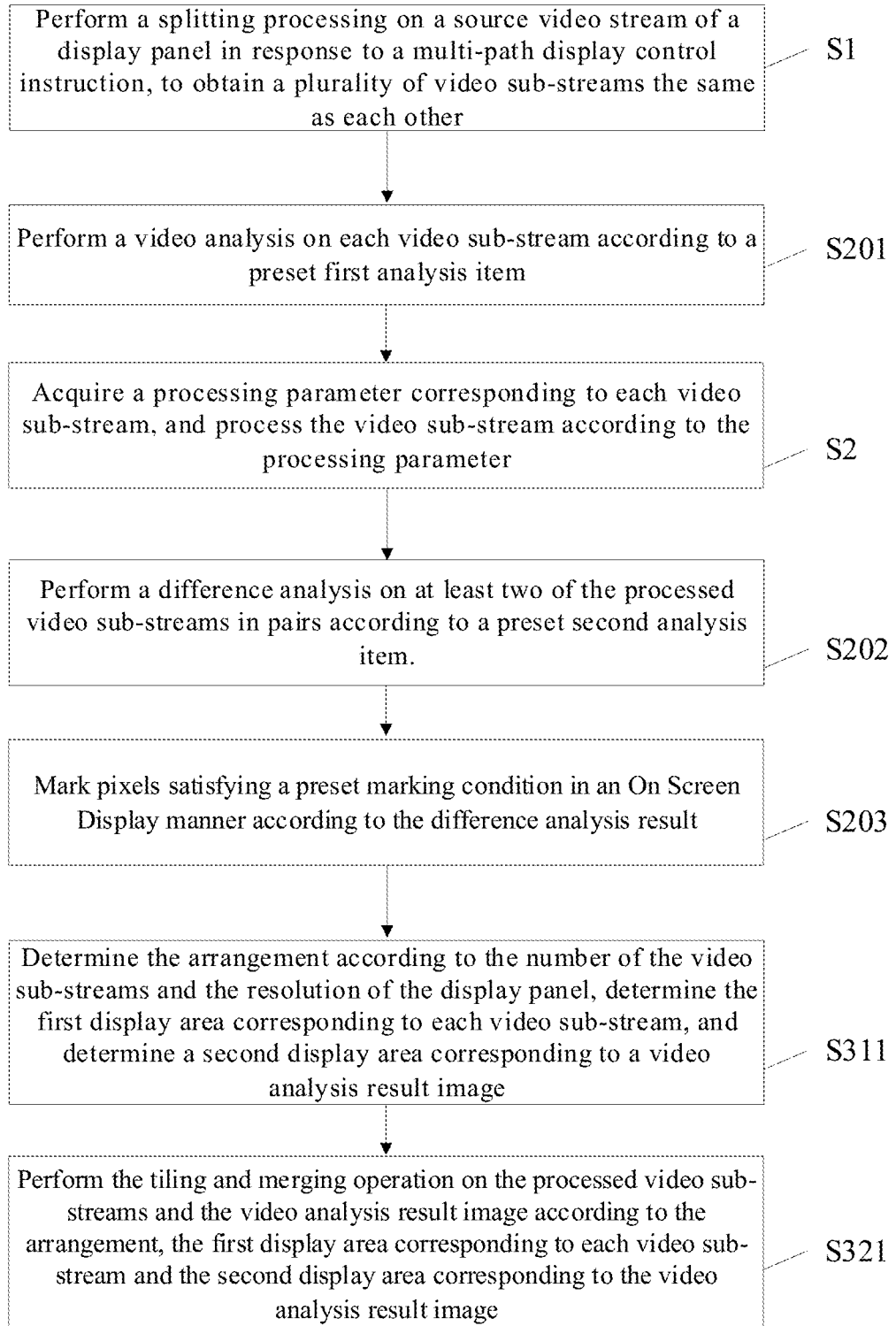
FIG. 9 is a flowchart of a display control method according to an embodiment of the present disclosure.

FIG. 9 is a flowchart of a display control method according to an embodiment of the present disclosure. In particular, the method is a specific alternative embodiment based on the method shown in FIG. 7. As shown in FIG. 9, the method includes not only steps S1 to S321, but also steps S202 and S203 before step S3. Only step S202 and step S203 will be described in detail below.

Before the step S3 of performing the tiling and merging operation on the processed video sub-streams to obtain the output video stream, the method further includes: a step S202.

Step S202, performing a difference analysis on at least two of the processed video sub-streams in pairs according to a preset second analysis item.

The second analysis item includes: at least one of a pixel value difference analysis, a pixel gray value difference analysis, or a pixel gradient characteristic value difference analysis. Regarding the above second analysis item, the difference analysis is performed on two pixels of the two video sub-streams at the same timing, the same frame and the same pixel position. Specifically, during performing the pixel value difference analysis, pixel values of the two pixels may be compared to obtain the difference analysis result: during performing the pixel gray value difference analysis, gray values of the two pixels may be compared to obtain the difference analysis result; during performing the pixel gradient characteristic value difference analysis, gradient characteristic values of the two pixels in the image of the frame may be compared to obtain the difference analysis result.

In some implementations, the second analysis item may further include a sub-pixel component difference analysis. Specifically, during performing the pixel-sub-pixel component difference analysis, values of sub-pixel components of the two pixels may be compared to obtain the difference analysis result. For example, for the video sub-streams based on the RGB color space, any one of red components, green components or blue components of the two pixels may be compared to obtain the difference analysis result.

Step S203, marking pixels satisfying a preset marking condition in an On Screen Display (OSD) manner (e.g., by adjusting through a screen display menu) according to the difference analysis result.

The marking condition is that the difference value between the two pixels subjected to the difference analysis is greater than a preset difference threshold: for marking the pixels, two pixels subjected to the difference analysis may be marked simultaneously, or only one of the two pixels subjected to the difference analysis may be marked. In some implementations, the pixel may be marked by a dot overlay of a particular color, or may be selected and marked by a line frame of a particular color, for example, the pixel may be marked by a red dot, a red frame, or the like.

It should be noted that the embodiment in which the video analysis and the difference analysis are implemented in combination is only a specific alternative embodiment provided by the present disclosure, which does not affect the protection scope of the technical solution of the present disclosure, and the embodiment in which the video analysis and the difference analysis are implemented independently is also applicable to the technical solution of the present disclosure.

The embodiment of the present disclosure provides the display control method, which can perform the video analysis on video sub-streams before the video image processing is performed on the video sub-streams, so that a user can clearly monitor image parameters of the video sub-streams: after the video image processing is performed on the video sub-streams, the difference analysis is performed on the video sub-streams in pairs, so that the user can accurately judge the processing effect and quality of the video images by combining the actually processed pictures and the perceptible difference. The video analysis and the difference analysis are implemented in combination, so that the user can intuitively monitor specific image parameters, and the perceptibility of the difference degree between different video image processing operations is improved.

Figure 10:
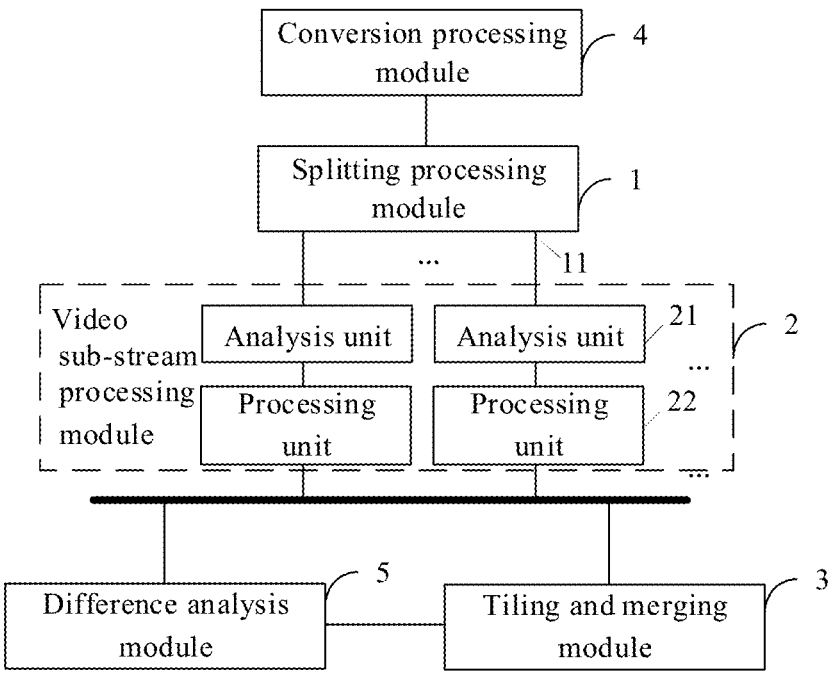
FIG. 10 is a schematic diagram of a structure of a display control device according to an embodiment of the present disclosure.

FIG. 10 is a schematic diagram of a structure of a display control device according to an embodiment of the present disclosure. As shown in FIG. 10, the device includes: a splitting processing module 1, a video sub-stream processing module 2 and a tiling and merging module 3.

The splitting processing module 1 includes a plurality of split output terminals 11; the splitting processing module 1 is configured to perform a splitting processing on a source video stream of a display panel in response to a multi-path display control instruction, to obtain a plurality of video sub-streams the same as each other; and output each video sub-stream through a corresponding one of the split output terminals 11, that is, each split output terminal 11 corresponds to one transmission path for transmitting one corresponding video sub-stream.

The video sub-stream processing module 2 includes a plurality of processing units 22, each processing unit 2 corresponds to one split output terminal 11, and is configured to acquire a processing parameter corresponding to each video sub-stream, process the video sub-stream according to the processing parameter, and output the processed video sub-stream.

The tiling and merging module 3 is configured to perform a tiling and merging operation on the processed video sub-streams to obtain an output video stream, and output the output video stream to the display panel for displaying.

In some implementations, the split output terminals 11 of the splitting processing module 1 are connected to the video sub-stream processing module 2 through a buffer device (e.g., a register) for data buffering.

In some implementations, as shown in FIG. 10, the display control device further includes: a conversion processing module 4.

The conversion processing module 4 is configured to perform a conversion process on the source video stream according to a display parameter of the display panel. The display parameter includes: at least one of a timing parameter, a color parameter, a resolution parameter, or a frame rate parameter.

In some implementations, as shown in FIG. 10, the video sub-stream processing module 2 further includes a plurality of analysis units 21 in one-to-one correspondence with the plurality of processing units 22; each analysis unit 21 is configured to perform a video analysis on each video sub-stream according to a preset first analysis item. The first analysis item includes: at least one of a color waveform analysis, a video luminance waveform analysis, a video color histogram analysis, a video luminance histogram analysis, a video color vector analysis, a video luminance pseudo-color marking, a video focus quality analysis, a video luminance area marking, or a video pixel visualization marking.

In some implementations, the tiling and merging module 3 is specifically configured to determine an arrangement according to the number of the video sub-streams and the resolution of the display panel, and determine a first display area corresponding to each video sub-stream; and perform the tiling and merging operation on the processed video sub-streams according to the arrangement and the first display area corresponding to each video sub-stream.

In some implementations, on the basis that the video sub-stream processing module 2 includes the plurality of analysis units 21, the tiling and merging module 3 is specifically configured to determine the arrangement according to the number of the video sub-streams and the resolution of the display panel, determine the first display area corresponding to each video sub-stream, and determine a second display area corresponding to a video analysis result image of each analysis unit 21, the first display area and the second display area being not overlapped with each other; and perform the tiling and merging operation on the processed video sub-streams and the video analysis result image according to the arrangement, the first display area corresponding to each video sub-stream and the second display area corresponding to the video analysis result image.

In some implementations, as shown in FIG. 10, the display control device further includes: a difference analysis module 5.

The difference analysis module 5 is configured to perform a difference analysis on at least two of the processed video sub-streams in pairs according to a preset second analysis item. The second analysis item includes: at least one of a pixel value difference analysis, a pixel gray value difference analysis, or a pixel gradient characteristic value difference analysis.

In some implementations, the display control device further includes a marking module (not shown) configured to mark pixels satisfying a preset marking condition in an On Screen Display (OSD) manner (e.g., by adjusting through a screen display menu) according to the difference analysis result.

In some implementations, as shown in FIG. 10, the tiling and merging module further includes: a timing control unit 31.

The timing control unit 31 is configured to generate a timing control signal according to the timing parameter corresponding to the display panel: the tiling and merging module 3 is specifically configured to perform a timing adjustment on the processed video sub-streams according to the timing control signal, and perform the tiling and merging operation on the video sub-streams subjected to the timing adjustment.

In some implementations, the tiling and merging module 3 is configured to determine the first display area corresponding to each video sub-stream, and then, read data at pixel positions in each frame of the video sub-streams in a same scanning sequence according to the timing control signal, and synchronously write the data into the first display areas, so that a frame of the output video stream is obtained and output upon the data is written into the first display areas.

In some implementations, the display control device further includes: a parameter control module (not shown) which is connected to a system control panel, has an external storage function, and is configured to transmit the multi-path display control instruction, the processing parameter, the display parameter of the display panel, the first analysis item, the resolution of the display panel, the second analysis item, the timing parameter corresponding to the display panel, and the like.

In some implementations, the display control device further includes: a memory module, a first storage control unit correspondingly disposed in the splitting processing module 1, and a second storage control unit (not shown) correspondingly disposed in the tiling and merging module 3: the memory module has an internal storage function, is configured to interact with the first storage control unit and the second storage control unit for caching data of the source video stream and the video sub-streams, and may adopt a double data rate (SDRAM, DDR for short).

Figure 11:
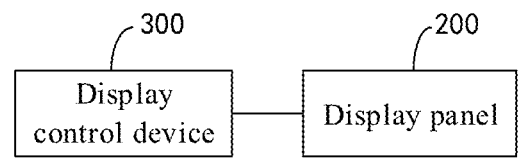
FIG. 11 is a schematic diagram of a display apparatus according to an embodiment of the present disclosure.

FIG. 11 is a schematic diagram of a display apparatus according to an embodiment of the present disclosure. As shown in FIG. 11, the display apparatus includes: a display panel 200 and the display control device 300. The display panel 200 is configured to display an output image generated by the display control device 300. In some implementations, the display apparatus may be specially a monitor device.

Figure 12:
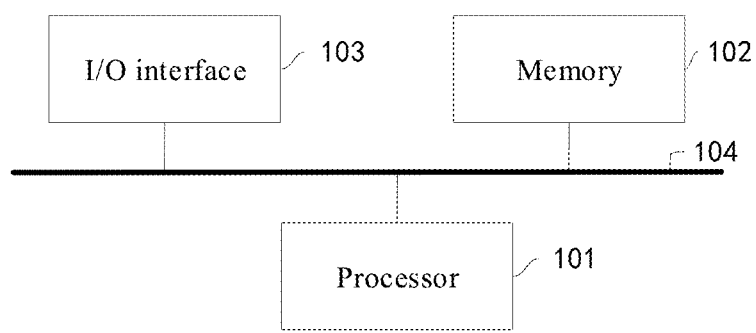
FIG. 12 is a block diagram of an electronic device according to an embodiment of the present disclosure.

FIG. 12 is a block diagram of an electronic device according to an embodiment of the present disclosure. As shown in FIG. 12, the electronic device includes: at least one processor 101, a memory 102, at least one I/O interface 103: the at least one processor 101 storing at least one program thereon, the at least one program, executed by the at least one processor 101, causes the at least one processor 101 to implement the display control method of the above embodiment. The at least one I/O interface 103 is connected between the at least one processor 101 and the memory 102 and is configured to enable information interaction between the at least one processor 101 and the memory 102.

Each processor 101 is a device with a data processing capability, and includes, but is not limited to, a central processing unit (CPU), or the like. The memory 102 is a device with a data storage capability, and includes, but is not limited to, a random access memory (RAM, more specifically, SDRAM, DDR, etc.), a read only memory (ROM), an electrically erasable programmable read only memory (EEPROM), a FLASH, or the like. Each I/O interface (read/write interface) 103 is connected between the processor 101 and the memory 102, and is configured to enable the information interaction between the processor 101 and the memory 102, and includes, but is not limited to, a data bus or the like.

In some implementations, the processor 101, the memory 102, and the I/O interface 103 are interconnected with each other via the bus 104, and then are connected to other components of a computing device.

In some implementations, the at least one processor 101 includes a plurality of graphics processors (GPU) that may be arranged in combination, to form an array of the graphics processors.

Figure 13:
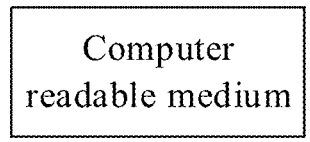
FIG. 13 is a block diagram of a computer readable medium according to an embodiment of the present disclosure.

FIG. 13 is a block diagram of a computer readable medium according to an embodiment of the present disclosure. The computer readable medium stores a computer program thereon, the computer program, when executed by a processor, causes the processor to implement the display control method of the above embodiment.

Ordinary skills in the art will appreciate that all or some of the steps in the method, functional modules/units in the device, disclosed above may be implemented as software, firmware, hardware, and suitable combinations thereof. In a hardware implementation, the division between functional modules/units mentioned in the above description does not necessarily correspond to the division of physical components. For example, one physical component may have multiple functions, or one function or step may be performed by several physical components in cooperation. Some or all of the physical components may be implemented as software executed by a processor, such as a Central Processing Unit, digital signal processor, or microprocessor, or implemented as hardware, or implemented as an integrated circuit, such as an application specific integrated circuit. Such software may be distributed on a computer readable medium, which may include a computer storage medium (or called non-transitory medium) and a communication medium (or called transitory medium). The term computer storage medium includes volatile and nonvolatile, removable and non-removable medium implemented in any method or technology for storing information, such as computer readable instructions, data structures, program modules or other data, as well known to ordinary skills in the art. The computer storage medium includes, but is not limited to, RAM, ROM, EEPROM, FLASH, or other storage techniques: CD-ROM, Digital Versatile Disk (DVD), or other optical disk storages: magnetic cassettes, magnetic tape, magnetic disk storage or other magnetic storages: any other medium which may be used to store the desired information and may be accessed by a computer. In addition, the communication medium typically includes computer readable instructions, data structures, program modules or other data in a modulated data signal such as a carrier wave or other transport mechanisms, and includes any information delivery medium, as well known to ordinary skills in the art.

The present disclosure has disclosed example embodiments, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as apparent to ordinary skills in the art. It will, therefore, be understood by ordinary skills in the art that various changes in form and details may be made without departing from the scope of the present disclosure as set forth in the claims.

What is claimed is:

1. A display control method, comprising:
performing a splitting processing on a source video stream of a display panel in response to a multi-path display control instruction, to obtain a plurality of video sub-streams the same as each other;
acquiring a processing parameter corresponding to each video sub-stream, and processing the video sub-stream according to the processing parameter; and
performing a tiling and merging operation on the processed video sub-streams to obtain an output video stream, and outputting the output video stream to the display panel for displaying,
the method further comprises:
before performing the tiling and merging operation on the processed video sub-streams to obtain the output video stream, performing a difference analysis on at least two of the processed video sub-streams in pairs according to a preset second analysis item, wherein the second analysis item comprises at least one of a pixel value difference analysis, a pixel gray value difference analysis, and a pixel gradient characteristic value difference analysis;
after performing the difference analysis on at least two of the processed video sub-streams in pairs according to the preset second analysis item, marking pixels satisfying a preset marking condition in an On Screen Display manner according to the difference analysis result, wherein the marking condition is that a difference value between any two pixels subjected to the difference analysis is greater than a preset difference threshold.

2. The display control method according to claim 1, further comprising:
before acquiring the processing parameter corresponding to each video sub-stream, and processing the video sub-stream according to the processing parameter, performing a video analysis on each video sub-stream according to a preset first analysis item,
wherein the first analysis item comprises:
at least one of a color waveform analysis, a video luminance waveform analysis, a video color histogram analysis, a video luminance histogram analysis, a video color vector analysis, a video luminance pseudo-color marking, a video focus quality analysis, a video luminance area marking, a video pixel visualization marking.

3. The display control method according to claim 1, wherein the processing parameter comprises: at least one of a color gamut parameter, a brightness parameter, a color temperature parameter, and a sharpness parameter.

4. The display control method according to claim 1, further comprising:
before performing the splitting processing on the source video stream of the display panel in response to the multi-path display control instruction, to obtain the plurality of video sub-streams the same as each other, performing a conversion process on the source video stream according to a display parameter of the display panel,
wherein the display parameter comprises: at least one of a timing parameter, a color parameter, a resolution parameter, and a frame rate parameter.

5. The display control method according to claim 1, wherein the multi-path display control instruction comprises the number of the video sub-streams; and
the performing the splitting processing on the source video stream of the display panel in response to the multi-path display control instruction, to obtain the plurality of video sub-streams the same as each other, comprises:
performing the splitting processing on the source video stream according to the number of the video sub-streams and a resolution of the display panel.

6. The display control method according to claim 1, wherein the performing the tiling and merging operation on the processed video sub-streams to obtain the output video stream, comprises:
generating a timing control signal according to a timing parameter corresponding to the display panel, performing a timing adjustment on the processed video sub-streams according to the timing control signal, and performing the tiling and merging operation on the video sub-streams subjected to the timing adjustment.

7. The display control method according to claim 1, wherein the performing the tiling and merging operation on the processed video sub-streams to obtain the output video stream, comprises:
determining an arrangement according to the number of the video sub-streams and the resolution of the display panel, and determining a first display area corresponding to each video sub-stream; and
performing the tiling and merging operation on the processed video sub-streams according to the arrangement and the first display area corresponding to each video sub-stream.

8. The display control method according to claim 7, further comprising:
performing a video analysis on each video sub-stream according to a preset first analysis item;
the determining the arrangement according to the number of the video sub-streams and the resolution of the display panel, and determining the first display area corresponding to each video sub-stream, comprises:
determining the arrangement according to the number of the video sub-streams and the resolution of the display panel, determining the first display area corresponding to each video sub-stream, and determining a second display area corresponding to a video analysis result image, the first display area and the second display area being not overlapped with each other; and
the performing the tiling and merging operation on the processed video sub-streams according to the arrangement and the first display area corresponding to each video sub-stream, comprises:
performing the tiling and merging operation on the processed video sub-streams and the video analysis result image according to the arrangement, the first display area corresponding to each video sub-stream and the second display area corresponding to the video analysis result image.

9. A display control device, comprising:
a splitting processing module comprising a plurality of split output terminals, the splitting processing module being configured to perform a splitting processing on a source video stream of a display panel in response to a multi-path display control instruction, to obtain a plurality of video sub-streams the same as each other, and output each video sub-stream through a corresponding one of the split output terminals;
a video sub-stream processing module comprising a plurality of processing units, each processing unit corresponding to one split output terminal, and being configured to acquire a processing parameter corresponding to each video sub-stream, process the video sub-stream according to the processing parameter, and output the processed video sub-stream; and
a tiling and merging module configured to perform a tiling and merging operation on the processed video sub-streams to obtain an output video stream, and output the output video stream to the display panel for displaying,
wherein the tiling and merging module is configured to determine an arrangement according to the number of the video sub-streams and the resolution of the display panel, and determine a first display area corresponding to each video sub-stream; and
perform the tiling and merging operation on the processed video sub-streams according to the arrangement and the first display area corresponding to each video sub-stream,
wherein the video sub-stream processing module comprises a plurality of analysis units;
the tiling and merging module is configured to determine the arrangement according to the number of the video sub-streams and the resolution of the display panel, determine the first display area corresponding to each video sub-stream, and determine a second display area corresponding to a video analysis result image of each analysis unit, the first display area and the second display area being not overlapped with each other, and perform the tiling and merging operation on the processed video sub-streams and the video analysis result image according to the arrangement, the first display area corresponding to each video sub-stream and the second display area corresponding to the video analysis result image.

10. The display control device according to claim 9, further comprising:
a conversion processing module configured to perform a conversion process on the source video stream according to a display parameter of the display panel, wherein the display parameter comprises: at least one of a timing parameter, a color parameter, a resolution parameter, and a frame rate parameter.

11. The display control device according to claim 9, wherein the video sub-stream processing module further comprises: a plurality of analysis units in one-to-one correspondence with the plurality of processing units;
each analysis unit is configured to perform a video analysis on each video sub-stream according to a preset first analysis item,
wherein the first analysis item comprises:
at least one of a color waveform analysis, a video luminance waveform analysis, a video color histogram analysis, a video luminance histogram analysis, a video color vector analysis, a video luminance pseudo-color marking, a video focus quality analysis, a video luminance area marking, a video pixel visualization marking.

12. The display control device according to claim 9, further comprising:
a difference analysis module configured to perform a difference analysis on at least two of the processed video sub-streams in pairs according to a preset second analysis item,
wherein the second analysis item comprises: at least one of a pixel value difference analysis, a pixel gray value difference analysis, and a pixel gradient characteristic value difference analysis.

13. The display control device according to claim 9, wherein the tiling and merge module further comprises:
a timing control unit configured to generate a timing control signal according to a timing parameter corresponding to the display panel; and
the tiling and merging module is configured to perform a timing adjustment on the processed video sub-streams according to the timing control signal, and perform the tiling and merging operation on the video sub-streams subjected to the timing adjustment.

14. A display apparatus, comprising:
a display panel and the display control device according to claim 9.

15. A non-transitory computer readable medium storing a computer program thereon, the the computer program, executed by a processor, causes the processor to implement the display control method according to claim 1.

16. The display control method according to claim 2, wherein the processing parameter comprises: at least one of a color gamut parameter, a brightness parameter, a color temperature parameter, and a sharpness parameter.

17. A display control method, comprising:
performing a splitting processing on a source video stream of a display panel in response to a multi-path display control instruction, to obtain a plurality of video sub-streams the same as each other;
acquiring a processing parameter corresponding to each video sub-stream, and processing the video sub-stream according to the processing parameter; and
performing a tiling and merging operation on the processed video sub-streams to obtain an output video stream, and outputting the output video stream to the display panel for displaying,
wherein the performing the tiling and merging operation on the processed video sub-streams to obtain the output video stream, comprises:
determining an arrangement according to the number of the video sub-streams and the resolution of the display panel, and determining a first display area corresponding to each video sub-stream; and
performing the tiling and merging operation on the processed video sub-streams according to the arrangement and the first display area corresponding to each video sub-stream,
the method further comprises:
performing a video analysis on each video sub-stream according to a preset first analysis item;
the determining the arrangement according to the number of the video sub-streams and the resolution of the display panel, and determining the first display area corresponding to each video sub-stream, comprises:
determining the arrangement according to the number of the video sub-streams and the resolution of the display panel, determining the first display area corresponding to each video sub-stream, and determining a second display area corresponding to a video analysis result image, the first display area and the second display area being not overlapped with each other; and
the performing the tiling and merging operation on the processed video sub-streams according to the arrangement and the first display area corresponding to each video sub-stream, comprises:
performing the tiling and merging operation on the processed video sub-streams and the video analysis result image according to the arrangement, the first display area corresponding to each video sub-stream and the second display area corresponding to the video analysis result image.

* * * * *